United States Patent [19]

Sano

[11] Patent Number: 5,313,498
[45] Date of Patent: May 17, 1994

[54] METHOD AND ARRANGEMENT OF ECHO ELIMINATION IN DIGITAL TELECOMMUNICATIONS SYSTEM

[75] Inventor: Hideo Sano, Tokyo, Japan
[73] Assignee: NEC Corporation, Tokyo, Japan
[21] Appl. No.: 898,847
[22] Filed: Jun. 15, 1992
[30] Foreign Application Priority Data
  Jun. 13, 1991 [JP] Japan .................................. 3-168818
  Apr. 28, 1992 [JP] Japan .................................. 4-109419
[51] Int. Cl.[5] .............................................. H04B 1/10
[52] U.S. Cl. .................................... 375/103; 375/102; 370/32.1; 379/410
[58] Field of Search ....................... 375/12, 14, 103, 99, 375/102; 370/32.1; 379/410, 411, 406

[56] References Cited

U.S. PATENT DOCUMENTS

| | | | |
|---|---|---|---|
| 4,554,417 | 11/1985 | Boyer . | |
| 4,796,296 | 1/1989 | Amada et al. | 370/32.1 |
| 4,835,765 | 5/1989 | Bergmans et al. | 379/410 |
| 4,864,608 | 9/1989 | Miyamoto et al. | 379/409 |
| 4,935,919 | 6/1990 | Hiraguchi | 379/410 |
| 5,163,044 | 11/1992 | Golden | 370/32.1 |

FOREIGN PATENT DOCUMENTS

0221221 5/1987 European Pat. Off. .

OTHER PUBLICATIONS

D. Duttweiler, Subsampling to Estimate Delay with Application to Echo Cancelling, IEEE Transactions on Acoustics, Speech, and Signal Processing, vol. AS-SP-31, No. 5, Oct. 1983, pp. 1090–1099.
P. Yip and D. Etter, an Adaptive Technique for Multiple Echo Cancelation in Telephone Networks, Dept. of Electrical/Computer Engineering, Univ. of New Mexico, 1987, pp. 2133–2136.
S. Ikeda and A. Sugiyama, An Adaptive Tap Placement Algorithm for an Adaptive FIR Filter and Its Application to An Echo Canceler, Spr. Gen. Assem. of Jap. Elec. Inform. Telecom, Assoc., 1990.

Primary Examiner—Stephen Chin
Assistant Examiner—Don N. Vo
Attorney, Agent, or Firm—Sughrue, Mion, Zinn, Macpeak & Seas

[57] ABSTRACT

In order to reduce the complexity of an adaptive digital filter used to cancel delayed network echoes, a delay circuit is arranged in series therewith and arranged to compensate for the delay inherent with a speech codec. In the case of a variable delay circuit, the degree by which the echo is delayed is detected in the adaptive digital filter and used to modify the delay time. A gain control arrangement can be provided and used to reduce the gain of the received signal when the near-end party is talking and the adaptive capacity of the adaptive digital filter is exceeded.

2 Claims, 5 Drawing Sheets

METHOD AND ARRANGEMENT OF ECHO ELIMINATION IN DIGITAL TELECOMMUNICATIONS SYSTEM

BACKGROUND OF THE INVENTION

1. Field of the Invention

The present invention relates generally to a method and arrangement of eliminating delayed echoes in a digital telecommunications system, and more specifically to such an arrangement and method by which delayed "network echoes" can effectively be canceled without incurring undesirable increase in the size of an adaptive digital filter as compared with the size of the counterpart provided in an analog telecommunications system. The term "network echoes" implies the echoes which are mainly caused by impedance mismatches in distant four-wire to two-wire hybrid(s) of public switched telephone networks.

2. Description of the Prior Art

Long distance telephone communications systems have been constantly plagued by the so called "echo" phenomenon. A known approach to solving this problem is the use of an echo canceler which by means of an adaptive digital filter makes an estimate of the transfer function of the echo path and uses that information to subtract the echo in the return path.

Before turning to the present invention it is deemed advantageous to describe a known echo canceler for use in a mobile telephone terminal of an analog mobile telephone communications system with reference to FIG. 1.

It should be noted that while the FIG. 1 arrangement is disclosed in connection with a vehicle mounted speakerphone, the present invention is not limited to such applications and can be applied to a wide variety of telecommunication systems.

The arrangement shown in FIG. 1 includes, an antenna 10, a duplexer 12, a front end 14, four amplifiers 16a–16d, two codecs 18, 20, a network echo canceler 22, an acoustic echo canceler 24, a loudspeaker 26 and a microphone 28, all of which are coupled as illustrated. A "codec" is defined as an assembly comprising an encoder and a decoder in the same equipment (CCITT recommendations). Merely by way of example, each of the codecs 18, 20 in this instance, is of a 64 kbit/sec μ-law (viz., A-law) PCM (pulse code modulation) type.

The codec 18 includes an analog/digital (A/D) converter 18a and a digital/analog (D/A) converter 18b. Similarly, the other codec 20 is provided with a D/A converter 20a and an A/D converter 20b. Further, the network echo canceler 22 includes an adaptive digital filter (ADF) 22a and an adder 22b, while the acoustic echo canceler 24 includes an ADF 24a and an adder 24b.

The front end (viz., radio signal section) 14 is supplied with an incoming radio signal (analog) via the antenna 12 and the duplexer 12. The analog signal outputted from the front end 14, is applied to an amplifier 16a by which the amplitude of the incoming signal is adjusted to a predetermined one. The A/D converter 18a converts the analog output of the amplifier 16a to the corresponding digital signal.

The ADF 22a of the network echo canceler 22 is arranged to receive the output of the acoustic echo canceler 24 and outputs an estimated (or synthetic) echo signal 22c. The network echo canceler 22 operates such as to eliminate the network echo by rendering an error signal Se zero. As is well known in the art, the network echo canceler 22 updates tap-coefficients of the ADF 22a using the learning algorithms which are demonstrated by the following equation (1).

$$H_{n+1} = H_n + \alpha * (X_n / X_n X_n^T) * Se_n \quad (1)$$

Where: $H_n$ is a row vector of tap-coefficient matrix at a time "n", $X_n$ a row vector of a matrix of the digitized incoming signal at a time n, $Se_n$ an error signal at a time n, $\alpha$ a convergence coefficient ($0 < \alpha < 2$), T indicates transposition of vector, and * indicates convolution.

When near-end and distant-end parties talk simultaneously, i.e., during double talk, the network echo canceler 22 is no longer able to correctly update tap-coefficients of the ADF 22a. This is because the distant party's signals mask the network echo. Accordingly, it is a current practice to provide a double talk detector to inhibit the updating of tap-coefficients of the ADF 22a while such is detected.

The aforesaid tap-coefficients updating and the double talk detection, are well known in the art and are not directly concerned with the present invention and, hence, further descriptions thereof will be omitted for simplifying the instant disclosure.

In the case where the tap-coefficients updating is correctly implemented, the distant party's speech signal is derived from the adder 22b during the double talk while effectively canceling the network echoes. The output of the adder 22b is applied to the ADF 24a of the acoustic echo canceler 20 and also is converted into the corresponding analog signal at the D/A converter 20a. The output of the D/A converter 20a is amplified by the amplifier 16b and then drives the loudspeaker 26.

A speech signal issued from the microphone 28 is amplified by the amplifier 16c and then converted into the corresponding digital signal at the A/D converter 20b. The adder 24b of the acoustic echo canceler 24 is arranged to subtract an estimated echo 24c (viz., the output of the ADF 24a) from the output of the A/D converter 20b. The acoustic echo canceler 24 operates in a manner which establishes an error signal Se' and eliminates the acoustic echo which is established via an acoustic coupling between the loudspeaker 26 and the microphone 28. The acoustic echo canceler 24 updates tap-coefficients of the ADF 24a in the same manner as in the network echo canceler 22 using the above mentioned learning algorithms shown by equation (1).

In the event that the tap-coefficients updating of the acoustic echo canceler 24 is correctly implemented, the near-by party's speech signal is derived from the adder 24b while the acoustic echoes are effectively canceled in a manner whereby no subjective interference to the telephone conversation occurs. The output of the adder 24b is applied to the ADF 22a and is also converted into the corresponding analog signal at the D/A converter 18b of the codec 18. The output of the D/A converter 18a is amplified by the amplifier 16d and then transmitted to the distant-end party (not shown) via the front end 14, the duplexer 12 and the antenna 10.

In the above mentioned arrangement (FIG. 1), the network echo is caused by a distant four-wire to two-wire hybrid provided in the vicinity of the distant-end party and is delayed by about 40 ms when returning to the network echo canceler 22. In the event that a sampling clock used in the FIG. 1 arrangement is 8 kHz, the number of samples derived during the 40 ms period is 320. Accordingly, the ADF 22a is required to have 320 taps in order to cancel the delayed network echo (40 ms).

FIG. 2 is a block diagram showing a digital type mobile terminal wherein the codec 18 of FIG. 1 is replaced with a speech codec 30.

The speech codec 30 in this instance takes the form of an LPC (linear predictive coding) codec such as a 11.2 kbit/s VSELPC (vector sum exited LPC) type. The ADF 22a of FIG. 1 should be modified to cancel the network echo whose delay time is prolonged due to the provision of the speech codec 30 and thus, in FIG. 2, a prime (') is added to the reference numerals 22, 22a for differentiating same from the counterparts of FIG. 1.

As is well known in the art, this type of coding offers low data rates ranging from 8-16 kbit/s (for example). This means that the 40 ms delayed network echo is further delayed by about 100 ms at the speech codec 30, and thus the total delay time of the network echo amounts to approximately 140 ms. Accordingly, if the sampling clock used in the FIG. 2 arrangement is 8 kHz (viz., the same as in the FIG. 1 arrangement), the number of samples taken during 140 ms is 1120. Accordingly, the ADF 22a must be provided with 1120 taps in order to cancel the network echo which is delayed by 140 ms.

Further, the network echo canceler 22 requires, for echo cancellation, 4 instruction steps per tap (viz., one instruction step for producing the estimated echo signal and three instruction steps for updating tap coefficients). This means that the network echo canceler 22 requires a computing power of about 36 MIPS (million instructions per second) (viz., $1120 \times 4 \times 8000 = 35.84$ millions).

Still further, in order to realize the adaptive digital filtering at the ADF 22a, it is necessary to provide a RAM (random access memory) with a memory capacity of 2,240 words for storing the 1120 tap coefficients and 1120 sampled data.

It is understood from the foregoing that the ADF 22a of FIG. 2 is rendered undesirably bulky, complex as compared with the FIG. 1 arrangement.

SUMMARY OF THE INVENTION

It is an object of the present invention to provide an arrangement and method of echo cancellation in digital telecommunications system which is able to avoid the undesirable increase in the size of the adaptive digital filter as in the prior art.

Another object of the present invention is to provide an arrangement and method of echo cancellation in digital telecommunications system which includes a delay circuit for delaying an input signal to the ADF of the network echo canceler.

Another object of the present invention is to provide an arrangement and method of echo cancellation in digital telecommunications system wherein the delay provided by the delay circuit is controllable.

Still Another object of the present invention is to provide an arrangement and method of echo cancellation in digital mobile communications system wherein the output of the speech codec is directly routed to the loudspeaker in the event that the delay amount of the network echo exceeds a predetermine value to an extent wherein the network canceler is rendered unable to implement the echo elimination.

In brief, the above objects are achieved by a technique wherein in order to reduce the complexity of an adaptive digital filter used to cancel delayed network echoes, a delay circuit is arranged in series therewith and arranged to compensate for the delay inherent with a speech codec. In the case of a variable delay circuit, the degree by which the echo is delayed is detected in the adaptive digital filter and used to modify the delay time. A gain control arrangement can be provided and used to reduce the gain of the received signal when the near-end party is talking and the adaptive capacity of the adaptive digital filter is exceeded.

A first aspect of the present invention comes in a method wherein a speech codec is arranged to encode a first signal to be transmitted and decode a second signal received, the method comprising the steps of: delaying the first signal by a first amount; supplying the delayed first signal to an adaptive digital filter; and producing a fourth signal by subtracting the output of the adaptive digital filter from a third signal which is produced by decoding the second signal at the speech codec and which exhibits a delay due to passage through the speech codec.

A second aspect of the present invention comes in an arrangement for use in a digital telecommunication system, the arrangement including a speech codec for encoding a first signal to be transmitted and decoding a second signal received, the arrangement comprising: first means for delaying the first signal by a first amount; second means for supplying the delayed first signal to an adaptive digital filter; and third means for producing a fourth signal by subtracting the output of the adaptive digital filter from a third signal which is produced by decoding the second signal at the speech codec and which exhibits a delay due to passage through the speech codec.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 2:
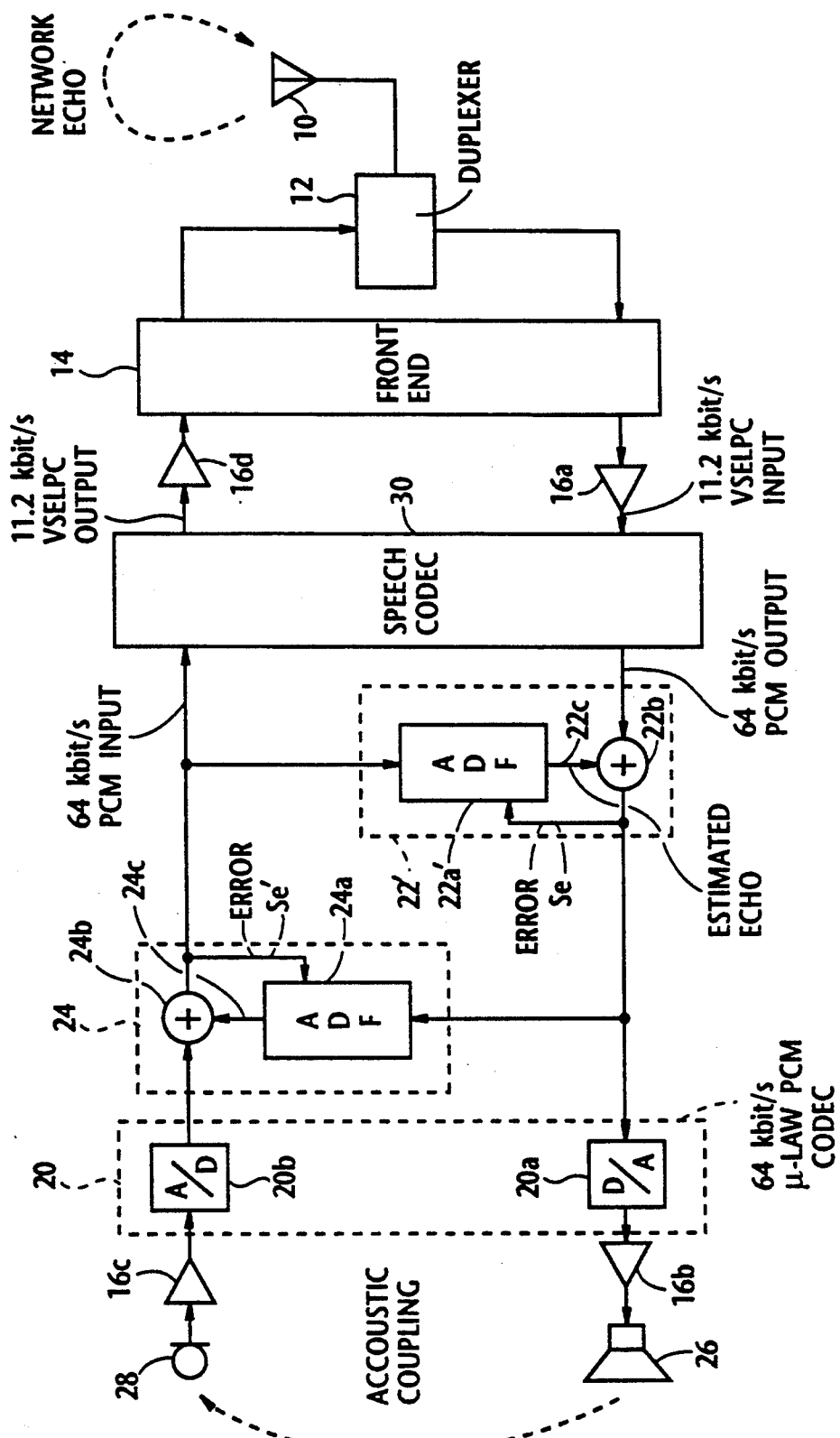
Figure 3:
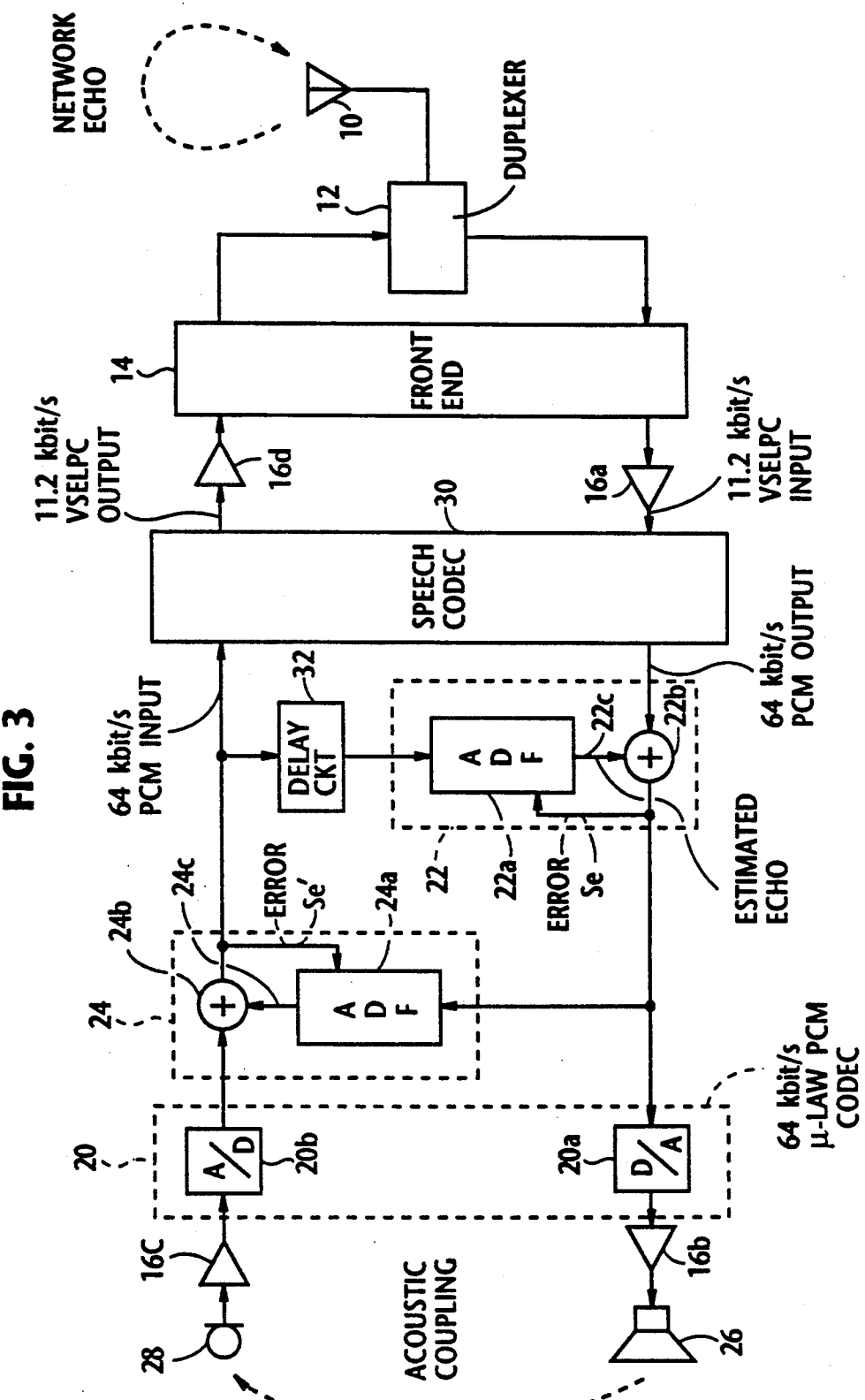
FIG. 3 is a block diagram showing the arrangement which characterizes a first embodiment of the present invention.

FIG. 3 is a block diagram showing a first embodiment of the present invention. This arrangement is basically the same as that shown in FIG. 2 and differs in that a delay circuit 32 is introduced and the complex ADF 22a' is replaced with the simpler ADF 22a of the FIG. 1 circuit. The remaining portions of FIG. 3 are essentially identical with those of FIG. 2 and hence further descriptions thereof will be omitted for the sake of brevity.

Figure 1:
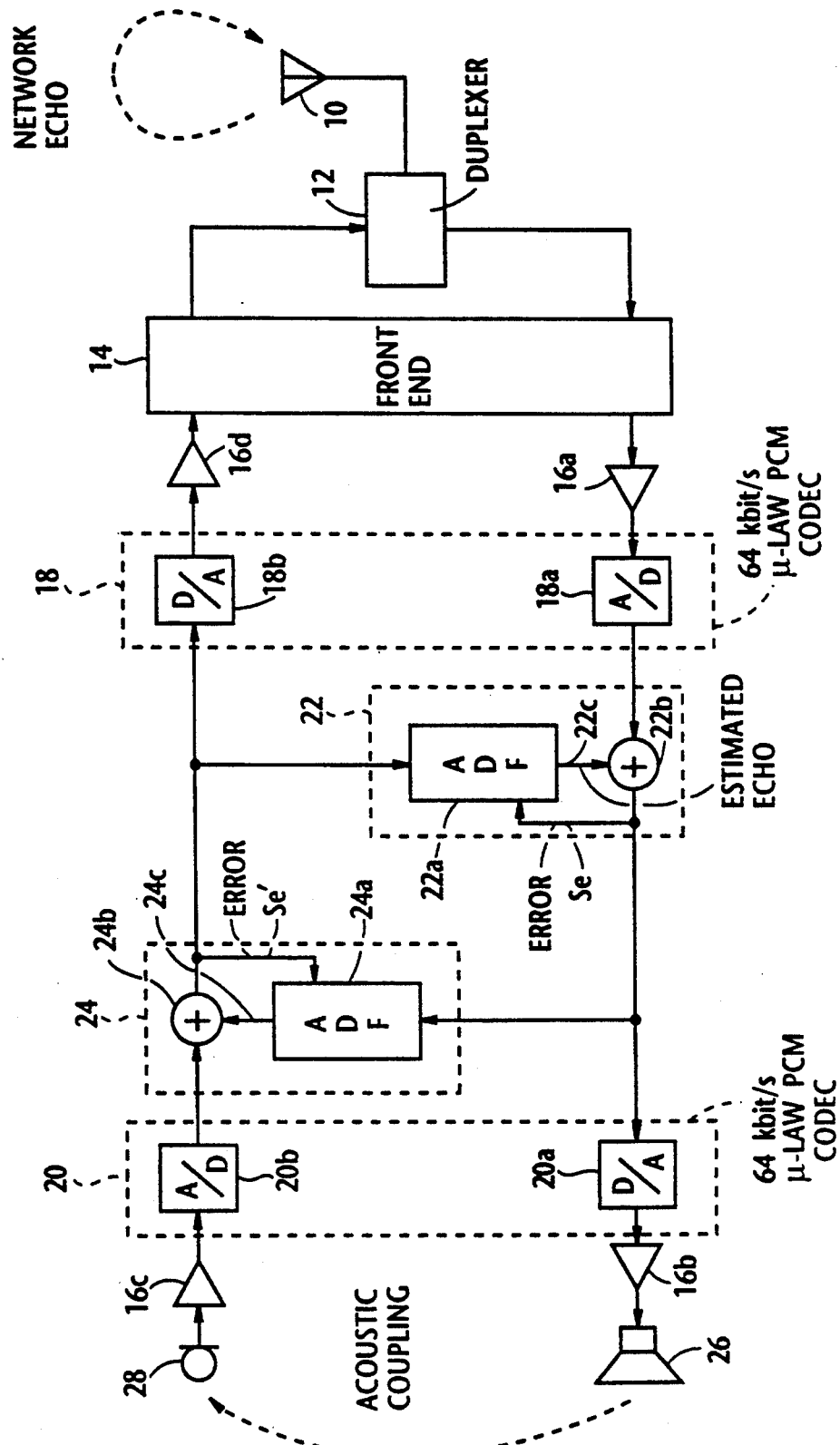
FIGS. 1 and 2 are block diagrams which show the prior art arrangements discussed in the opening paragraphs of the instant disclosure.

The purpose of the delay circuit 32 is to compensate for the delay of the network echo, and enable the ADF 22a' of FIG. 2 to be replaced by the ADF 22a used in the analog type telephone terminal shown in FIG. 1.

In more specific terms, the delay circuit 32 is to delay the input to the ADF 22a by the delay time incurred by the provision of the speech codec 30.

As in the case of the FIG. 2 arrangement, if the network echo applied to the speed codec 30 is delayed thereat by 100 ms and if the control clock rate of the FIG. 3 arrangement is 8 kHz, then the delay circuit 32 retards the application of the digital input to the ADF 22a by 800 sampling time (viz., the number of samplings which occur in a 100 ms period).

Figure 4:
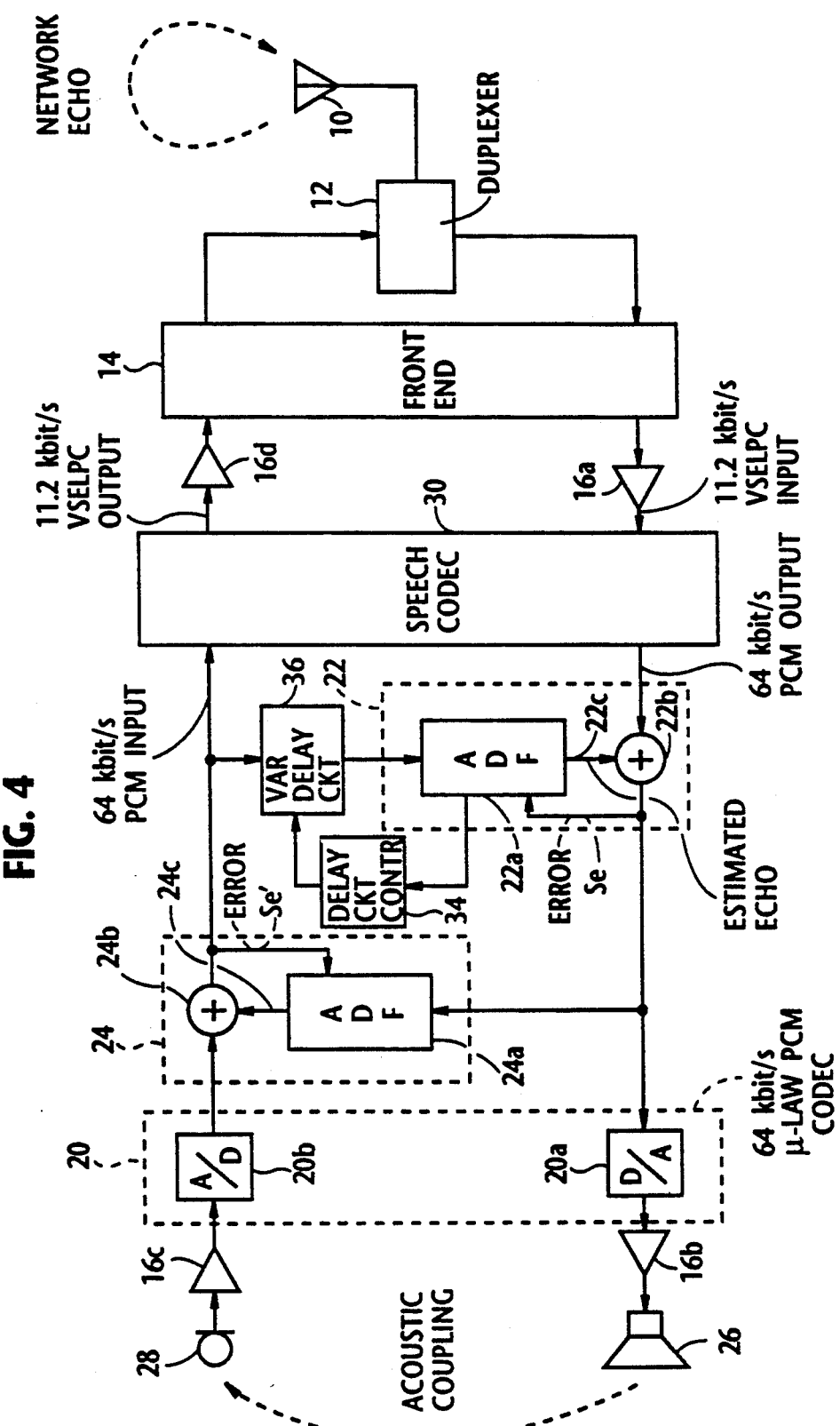
FIGS. 4 and 5 are block diagrams showing second and third embodiments of the present invention, respectively.

FIG. 4 is a block diagram showing a second embodiment of the present invention. In this embodiment a delay circuit controller 34 is provided and the delay circuit 32 of FIG. 3, is replaced with a variable delay circuit 36. The remaining portions of FIG. 4 are identical with those of FIG. 3.

The delay in the network echo varies depending on the communications paths between the near-end and distant-end parties. If the two parties are not too far apart, the delayed network echo mainly results from the aforesaid impedance mismatch in a remote four-wire to two-wire hybrid(s) of a public switched telephone network (and therefore is about 40 ms for example). However, in the case of overseas communications such as via a satellite link (for example), the network echo is extensively delayed as compared with local communications. It is therefore necessary to detect the delay of the network echo and adjust the delay time applied to the input to the ADF 22a.

In brief, the delay circuit controller 34 is coupled to the ADF 22a and detects the delay time of the network echo. The actual delay time of the network echo thus determined is applied to the variable delay circuit 36 which in turn controls the delay of the input to the ADF 22a on the basis of the detected delay time.

The delay circuit controller 34 can be configured using known techniques such as disclosed in a paper entitled "Subsampling to estimate delay with application to echo canceling" by D. L. Duttweiler, IEEE trans. ASSP. 31, pp. 1090–1099, or a paper entitled "An adaptive technique for multiple echo cancellation in telephone networks" by P. C. Yip and D. M. Etter, ICASSP 87, pp. 2133–2136, or a paper entitled "An adaptive tap placement algorithm for an adaptive FIR filter and its application to an echo canceler" by Shigeji IKEDA and Akihiko SUGIYAMA, A-177, 1990 Spring General Assembly of Japanese Electronics Information Telecommunication Association.

Accordingly, details of the delay circuit controller 34 will be omitted for the sake of simplicity.

Figure 5:
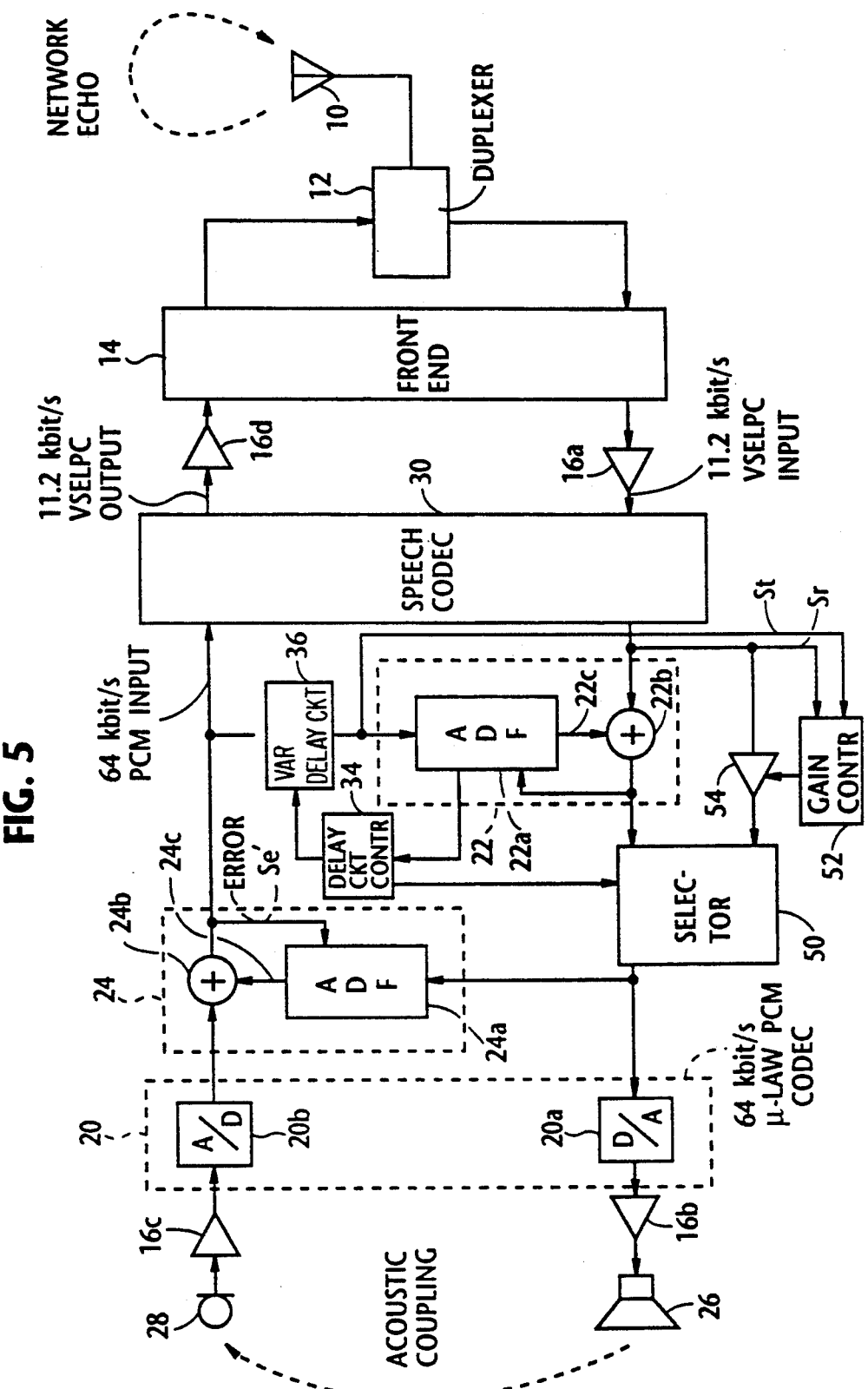

FIG. 5 is a block diagram showing a third embodiment of the present invention. This embodiment additionally includes a selector 50, a gain controller 52 and a variable gain amplifier 54 as compared with the second embodiment. The remaining portions of FIG. 5 are essentially identical with those of FIG. 4 and hence further descriptions thereof will be omitted for the sake of brevity.

The third embodiment is directed to effectively attenuate the network echo in the event that the ADF 22a is unable to cancel the delayed network echo such as occurs when the delay exceeds the adaptive filtering capacity of the ADF 22a. The delay circuit controller 34 checks to see if the delay of the network echo is within the range wherein the network echo canceler 22 is capable of canceling the delayed echo. If the outcome of the check is affirmative, the delay circuit controller 34 applies a logic "1" (for example) to the selector 50. In this instance, the selector 50 selects the output of the echo canceler 22 and thus, this operation is exactly the same as disclosed in connection with the second embodiment.

On the other hands, if the delay circuit controller 34 detects that the delay of the network echo exceeds the adaptive filtering capacity of the canceler 22, the delay circuit controller 34 produces logic "0". The selector 50 responds to logic "0" and selects the output of the variable gain amplifier 54. In this case, the gain controller 52 compares the output (St) of the variable delay circuit 36 with the output (Sr) of the speech codec 30. If St>Sr (viz., the near-end party is talking), the gain controller 52 reduces the gain of the amplifier 54 to a predetermined level. Thus, the delayed network echo is effectively attenuated even if the network canceler 22 is not able to cope with the situation. On the other hand, if the gain controller 52 detects St<Sr (viz., the distant-end party is talking), then the gain of the amplifier 54 is not lowered and the signal Sr passes the amplifier 54 without attenuation.

It will be understood that the above disclosure is only representative of three possible embodiments of the present invention and that the concept on which the present invention is based is not specifically limited thereto.

What is claimed is:

1. An arrangement for eliminating a network echo in a telecommunication system, said arrangement including a speech codec for encoding a first signal to be transmitted and for decoding a second signal received from a telecommunications network, said arrangement comprising:

first means for variably delaying said first signal and for producing a delayed first signal;

second means for canceling said network echo, said second means being arranged to receive said delayed first signal and an output of said speech codec;

third means for controlling attenuation of said output of said speech codec, said third means being arranged in parallel with said second means;

fourth means for detecting a delay time of said network echo, said fourth means being coupled to said second means and controlling said first means using the detected delay time; and fifth means for selecting one of the outputs of said second and third means, said fifth means selecting the output of said third means when said fourth means detects that the delay of said network echo exceeds an adaptive filtering capacity of said second means.

2. An arrangement as claimed in claim 1, wherein said third means includes:

a variable gain amplifier to which said output of said speech codec is applied; and a gain controller which is arranged to compare said output of said speech codec, $S_r$, with said delayed first signal, $S_t$, said gain controller controlling said variable gain amplifier in a manner to attenuate said output of said speech codec when $S_t>S_r$, said gain controller controlling said variable gain amplifier such as to give no attenuation to said output of said speech codec when $S_t<S_r$, the output of said variable gain amplifier being applied to said fifth means.

* * * * *

UNITED STATES PATENT AND TRADEMARK OFFICE
CERTIFICATE OF CORRECTION

PATENT NO. : 5,313,498
DATED : May 17, 1994
INVENTOR(S) : Hideo Sano

It is certified that error appears in the above-indentified patent and that said Letters Patent is hereby corrected as shown below:

```
Col. 2, line 58, delete "18b" and insert --18a--;
Col. 2, line 59, delete "18a" and insert --18b--.
Col. 3, line 27, delete "22" and insert --22'--;
Col. 3, line 31, delete "22" and insert --22'--;
Col. 3, line 36, delete "22a" and insert --22a'--;
Col. 3, line 40, delete "22a" and insert --22a'--.
```

Signed and Sealed this

Twenty-ninth Day of November, 1994

Attest:

BRUCE LEHMAN

*Attesting Officer*  *Commissioner of Patents and Trademarks*